US012715732B2

(12) United States Patent
Hawkins et al.

(10) Patent No.: US 12,715,732 B2
(45) Date of Patent: Aug. 25, 2026

(54) METHOD FOR OPERATING AN ELEVATOR SYSTEM AND ELEVATOR SYSTEM

(71) Applicant: KONE Corporation, Helsinki (FI)

(72) Inventors: Giovanni Hawkins, Helsinki (FI); Andrea Zotti Galletti, Helsinki (FI); Nithil Karimpanackal Natarajan, Helsinki (FI); Benjamin Ekström, Helsinki (FI); Aki Haikonen, Helsinki (FI); Klaus Mäkelä, Helsinki (FI); Sakke Ahoniemi, Helsinki (FI)

(73) Assignee: KONE CORPORATION, Helsinki (FI)

(*) Notice: Subject to any disclaimer, the term of this patent is extended or adjusted under 35 U.S.C. 154(b) by 958 days.

(21) Appl. No.: 17/963,625

(22) Filed: Oct. 11, 2022

(65) Prior Publication Data

US 2023/0035019 A1 Feb. 2, 2023

Related U.S. Application Data

(63) Continuation of application No. PCT/FI2020/050272, filed on Apr. 24, 2020.

(51) Int. Cl.

*B66B 1/34* (2006.01)
*B66B 1/24* (2006.01)
(Continued)

(52) U.S. Cl.

CPC .......... *B66B 1/3461* (2013.01); *B66B 1/2458* (2013.01); *B66B 1/3476* (2013.01); (Continued)

(58) Field of Classification Search

CPC ... B66B 1/3461; B66B 1/2458; B66B 1/3476; B66B 1/468; B66B 3/002; (Continued)

(56) References Cited

U.S. PATENT DOCUMENTS

| | | | | |
|---|---|---|---|---|
| 5,192,836 A | 3/1993 | Schroder | | |
| 2012/0181118 A1* | 7/2012 | Choi | B66B 3/02 187/393 | |

(Continued)

FOREIGN PATENT DOCUMENTS

| | | | |
|---|---|---|---|
| EP | 0544540 A2 | 6/1993 | |
| EP | 3560871 A1 | 10/2019 | |

(Continued)

OTHER PUBLICATIONS

International Search Report, issued in PCT/FI2020/050272, PCT/ISA/210, dated Nov. 30, 2020.

(Continued)

*Primary Examiner* — Bickey Dhakal
(74) *Attorney, Agent, or Firm* — Birch, Stewart, Kolasch & Birch, LLP

(57) ABSTRACT

A method for operating an elevator system that includes an elevator car movable between landings in response to an elevator call registered by an elevator control unit. The method includes determining a special operating mode of the elevator system, the special operating mode being different from a nominal operating mode at least with respect to a characteristic of use of the elevator car, and operating, in the special operating mode, the elevator system so as to reduce a number of passengers entering the elevator car from the landing compared to the nominal operating mode based on the characteristic.

19 Claims, 4 Drawing Sheets

(51) Int. Cl.
*B66B 1/46* (2006.01)
*B66B 3/00* (2006.01)

(52) U.S. Cl.
CPC .............. *B66B 1/468* (2013.01); *B66B 3/002* (2013.01); *B66B 2201/215* (2013.01); *B66B 2201/223* (2013.01); *B66B 2201/403* (2013.01); *B66B 2201/4638* (2013.01)

(58) Field of Classification Search
CPC ........ B66B 2201/215; B66B 2201/223; B66B 2201/403; B66B 2201/4638; B66B 2201/102; B66B 2201/103; B66B 2201/222
See application file for complete search history.

(56) References Cited

U.S. PATENT DOCUMENTS

| | | | | |
|---|---|---|---|---|
| 2016/0207735 | A1* | 7/2016 | Elomaa | B66B 1/2458 |
| 2020/0270095 | A1 | 8/2020 | Fumiya et al. | |
| 2022/0033220 | A1* | 2/2022 | Sudi | B66B 13/143 |

FOREIGN PATENT DOCUMENTS

| | | | |
|---|---|---|---|
| GB | 2284489 | A | 6/1995 |
| JP | 2014-15288 | A | 1/2014 |
| JP | 2014-51359 | A | 3/2014 |
| JP | 2020-11841 | A | 1/2020 |
| KR | 10-1491464 | B1 | 2/2015 |
| WO | WO 2009/084077 | A1 | 7/2009 |
| WO | WO 2019/106801 | A1 | 6/2019 |

OTHER PUBLICATIONS

Written Opinion of the International Searching Authority, issued in PCT/FI2020/050272, PCT/ISA/237, dated Nov. 30, 2020.

* cited by examiner

METHOD FOR OPERATING AN ELEVATOR SYSTEM AND ELEVATOR SYSTEM

CROSS REFERENCE TO RELATED APPLICATIONS

This application is a Continuation of PCT International Application No. PCT/FI2020/050272 filed on Apr. 24, 2020, which is hereby expressly incorporated by reference into the present application.

FIELD OF THE INVENTION

The present invention relates in general to elevator systems. In particular, however not exclusively, the present invention concerns operating elevator systems by taking into account special circumstances, for example, in which reduction of contacts or maintaining distance between the passengers is desirable.

BACKGROUND

Typically, elevators are designed so as to move as many passengers between landings of the elevator as possible. There are, however, special use cases in which it is desirable to have social distance between the passengers. The case can be, for example, an epidemic, seasonal flue, etc., or in case of special elevators, such as the ones in hospitals, having stricter requirements with respect to human contacts.

SUMMARY

An objective of the present invention is to provide a method for operating an elevator system and an elevator system. Another objective of the present invention is that the method and the elevator system allow more distance to be held between the passengers utilizing the elevator car.

The objectives of the invention are reached by a method and an elevator system as defined by the respective independent claims.

According to a first aspect, a method for operating an elevator system is provided. The elevator system comprises an elevator car movable between landings, for example, in response to an elevator call registered by an elevator control unit. The method comprises determining a special operating mode of the elevator system, the special operating mode being different from a nominal operating mode at least with respect to a characteristic of use of the elevator car. The method further comprises operating, in the special operating mode, the elevator system so as to reduce a number of passengers entering the elevator car from the landing compared to the nominal operating mode based on the characteristic.

In some embodiments, the method may comprise, in the special operating mode, visually and/or audibly indicating the determination of the special operating mode outside the elevator car.

In various embodiments, the method may comprise configuring a special capacity limit, such as of an elevator car, in the special operating mode to be lower than a nominal capacity limit in the nominal operating mode. Furthermore, the elevator system, or at least the respective elevator or elevator car, may be arranged to issue an alert if the special capacity limit is exceeded, such as a visual and/or audible alert. Optionally, the special capacity limit may be related to a total weight or a number of passengers inside the elevator car.

In various embodiments, the elevator system may comprises a group of elevator, wherein elevator cars of the group are movable in designated elevator shafts, in which case the method may comprise co-operating the elevator cars. For example, the method may comprise arranging, in the special operating mode, at least two of the elevator cars to the landing so as to allow distribution of the number of passengers into the at least two elevator cars. Alternatively or in addition, the method may comprise arranging, in the special operating mode, each one of the elevator cars which are empty to the landing so as to allow distribution of the number of passenger into the at least two elevator cars. Furthermore, alternatively or in addition, if the elevator control unit, or the calling system thereof or in connection thereto, is configured to record multiple calls from the landing, the method may comprise arranging, in the special operating mode, as many elevator cars to the landing as the number of calls from said landing. Still further, alternatively or in addition, the method may comprise arranging, in the special operating mode, all empty elevator cars to a main landing.

In various embodiments, the method may comprise configuring, in the special operating mode, only the elevator car which is or cars which are empty to respond to the call.

In various embodiments, the method may comprise bypassing, in the special operating mode, the landings from which calls are recorded if the elevator car is not empty.

In various embodiments, the method may comprise utilizing, in the special operating mode, in response to the call, the elevator car which has been unused for the longest.

Furthermore, the method may comprise indicating instructions outside the elevator car instructing to enter the elevator car alone.

According to a second aspect, an elevator system is provided. The elevator system may comprise at least one elevator car movable between landings, for example, in response to an elevator call, and an elevator control unit. The elevator control unit is configured to at least determine a special operating mode of the elevator system, the special operating mode being different from the nominal operating mode at least with respect to a characteristic of use of the elevator car, and operate, in the special operating mode, the elevator system so as to reduce a number of passengers entering the elevator car from the landing compared to the nominal operating mode based on the characteristic.

The present invention provides a method for operating an elevator system and an elevator system. The present invention provides advantages over known so-lutions in that it allows maintaining distance between passengers in the elevator car.

Various other advantages will become clear to a skilled person based on the following detailed description.

The terms "first", "second", and so on are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
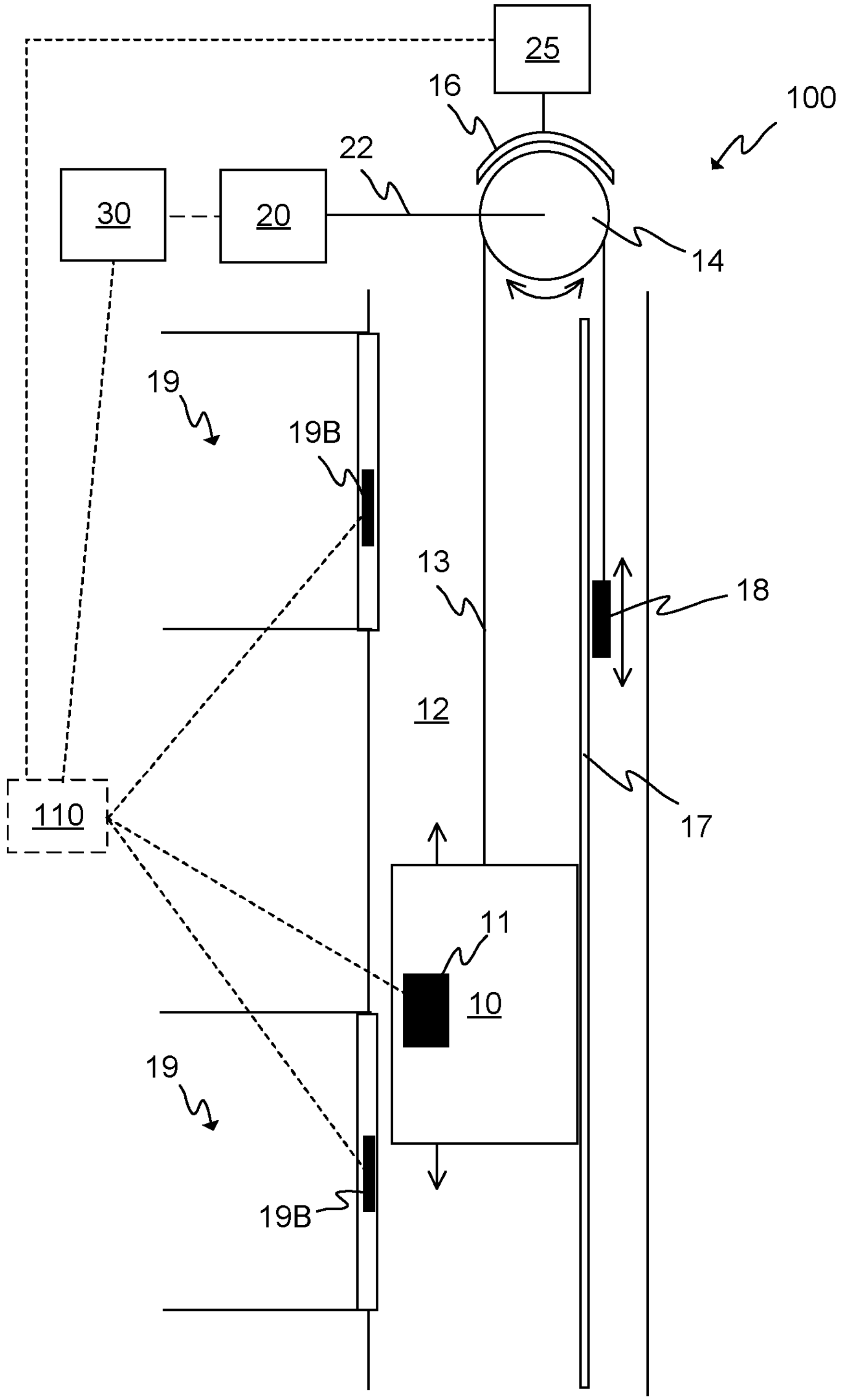
FIG. 1 illustrates schematically an elevator system according to an embodiment of the present invention.

FIG. 1 illustrates schematically an elevator system 100, or an elevator thereof, according to an embodiment of the present invention. The elevator system 100 may comprise an elevator car 10 arranged to be moved, or is movable, in an elevator shaft 12. The moving of the elevator car 10 may be implemented, preferably, by a hoisting rope or belt 13 in connection with a traction sheave 14 or the like. Furthermore, the elevator 100 may comprise an elevator motor 20 arranged to operate, such as rotate, the traction sheave 14 for moving the elevator car 10. The traction sheave 14 may be connected, via a mechanical connection 22, directly or indirectly via a gear to a shaft of the motor 20. The elevator system 100 may comprise a machine room or be machine roomless, such as have the motor 20 in the elevator shaft 12. The elevator car 10 preferably comprises an interface, such as a car operating panel 11, for example, for selecting the landing 19 to which the passenger wishes to travel. There may preferably also be landing call devices 19B being arranged to register calls for the elevator car 10. The elevator system 100 may also comprise an elevator control unit 110 for controlling the operation of the elevator system 100. The unit 110 may be a single unit or distributed in various positions, preferably, of the elevator system 100.

Alternatively or in addition, there may be destination operating panel(s) (not shown in FIG. 1) which may be arranged to various positions in the environment, such as the building, in which the elevator system 100 resides. The destination operating panel, if any, may be arranged to receive an elevator call for certain landing. Thus, the passenger already inputs the landing 19 to which he wishes to travel before entering the car 10. The destination operating panel may be such that it can be connected with a remote terminal, such as a smart phone or an identification tag, of the passenger. Thus, the destination operating panel may comprise wireless communication means and/or tag readers or the like.

The elevator system 100 may preferably comprise at least one hoisting machinery brake 16 configured for resisting or, preferably, preventing the movement of the motor 20, that is the rotor thereof, directly or via the traction sheave 14 or components thereof and/or therebetween. Furthermore, the elevator system 100 may comprise a brake controller 25 configured to operate at least one of the at least one hoisting machinery brake 16.

There may additionally be, at least in some embodiments, a counterweight 18 arranged in connection with the elevator car 10 such as is known to a person skilled in the art of elevators. Still further, the elevator system 100 may additionally comprise a guide rail 17 or rails 17 arranged into the elevator shaft 12 for guiding the movement of the elevator car 10.

The elevator system 100 of FIG. 1 further comprises an electrical converter unit 30, such as including an inverter or a frequency converter, for connecting to, and controlling the operation of, the motor 20. The electrical converter unit 30 may be arranged to provide electrical power (signals), such as having variable volt-age and variable frequency, to the windings of the elevator motor 20.

The elevator system 100 preferably comprises landings 19 or landing floors 19 and, for example, landing floor doors and/or openings, between which the elevator car 10 is arranged to be moved during nominal operation of the elevator system 100, such as to move persons and/or items between said floors 19.

Figure 2:
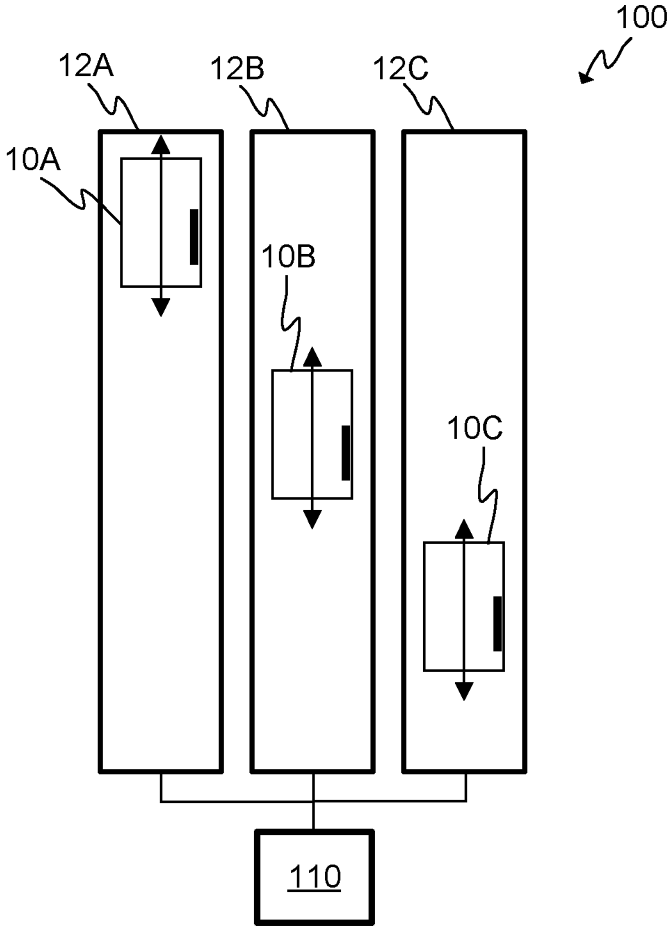
FIG. 2 illustrates schematically an elevator system according to an embodiment of the present invention.

FIG. 2 illustrates schematically an elevator system 100 according to an embodiment of the present invention. The elevator system 100 may comprise two or at least two, such as three, elevators, that is, comprising at least two, such as three, elevator cars 10A-10C arranged to be moved in their respective elevator shafts 12A-120. The elevator system 100 may be similar to the one illustrated in and described in connection with FIG. 1 with respect to a single or some or each of the elevator cars 10A-10C and elevator shafts 12A-12C. Thus, FIG. 2 may illustrate a group of elevators, the elevator cars 10A-10C of which may be arranged to serve the same landings 19 (not shown in FIG. 2.).

Figure 3:
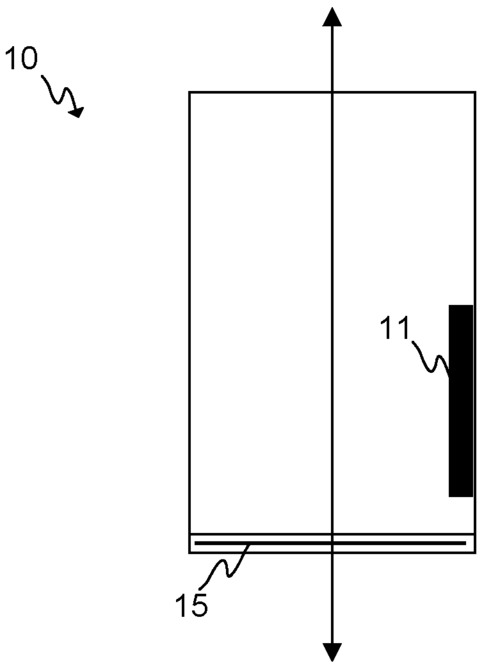
FIG. 3 illustrates schematically an elevator car according to an embodiment of the present invention.

FIG. 3 illustrates schematically an elevator car 10 according to an embodiment of the present invention. The elevator car 10 as illustrated in FIG. 3 and/or described in the following may be utilized in an elevator having a single elevator car 10 and shaft 12 or as one or several of the elevator cars 10A-10C of a group of elevators. The elevator car 10 preferably comprises an interface, such as a car operating panel 11, for example, for selecting the landing 19 to which the passenger wishes to travel.

In various embodiments, the elevator system 100 may comprise a load determining device for determining a number of passengers inside the elevator car 10. In FIG. 3, the load determining device is a weighing device 15 which is arranged into the elevator car 10 and is arranged, such as to the floor of the car 10, to measure the total weight of the passengers and/or other material to be transported inside the car 10. In another embodiment, the weighing device 15 may be arranged into some other position of the elevator car 10 or even outside thereof for substantially directly or indirectly determining the loading of the elevator car 10.

In some other embodiments, the load determining device may be arranged inside or outside of the elevator car 10 and arranged to determine the number of passengers by utilizing a visual sensor, such as a camera, for determining the amount of passengers inside the car 10 or entering the car 10.

Still in another embodiments, the load determining device may be arranged in connection to the hoisting rope 13 and/or the elevator motor 20 and/or the traction sheave 14 for determining the loading of the elevator car 10.

Furthermore, the load determining device, such as the weighing device 15, may be utilized to determining the loading and to compare it to the special capacity limit in the special operating mode in accordance with an embodiment. The elevator car 10 may be configured to stay at the landing 19 as long as the special capacity limit is being exceeded, that is with respect to the total weight and/or the number of passengers. Optionally, if the loading exceeds the special capacity limit, the elevator system 100, or specifically an elevator car 10 thereof, may be arranged to produce an alert which may be a visual and/or audible alert. The alert may be arranged to instruct the passengers about having too many of them in the elevator car 10 and, optionally, recommend that one or some of the passengers would leave the car 10.

Figure 4:
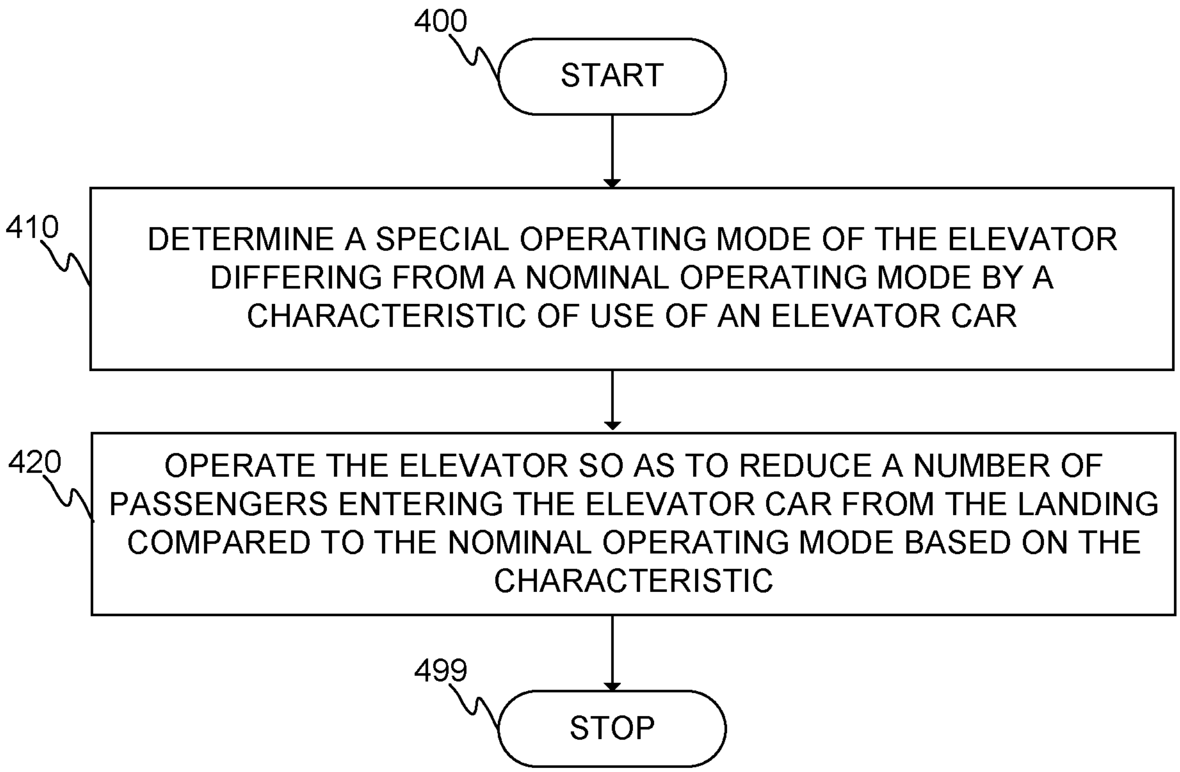
FIG. 4 shows a flow diagram of a method according to an embodiment of the present invention.

FIG. 4 shows a flow diagram of a method according to an embodiment of the present invention.

Step 400 refers to a start-up phase of the method. Suitable equipment and components are obtained and systems assembled and configured for operation. In various embodiments, the elevator system 100 as schematically illustrated in FIG. 1 or 2, and, optionally, the elevator car 10 as shown in FIG. 3, may be arranged into operation. Furthermore, what is described hereinabove in connection to FIGS. 1-3, however, not visible in the figures, may also apply depending on the embodiment.

Step 410 refers to determining a special operating mode of the elevator system 100, the special operating mode being different from a nominal operating mode at least with respect to a characteristic of use of the elevator car 10.

The characteristic of use may refer herein to a method of operating the elevator car or cars 10 of the elevator system 100. For example, it may refer to which elevator car or cars 10 are being arranged to a landing in response to elevator call performed by a passenger to be. On the other hand, it may refer to adapting a capacity limit of the elevator car 10, thereby affecting, for example, the maxi-mum amount of passengers allowed to be in the car 10 at the same time.

The determination of the special operating mode may be performed, for example, by changing the mode of the elevator system 100 by an operator via or in the elevator control unit 110, for instance. Alternatively, the determination may be performed based on a timing sequence, such as, utilizing the special operating mode during certain time periods, such as in the evenings. Further, the special operating mode may be initiated remotely.

Step 420 refers to operating, in the special operating mode, the elevator system 100 so as to reduce a number of passengers entering the elevator car 10 from the landing 19 compared to the nominal operating mode based on the characteristic.

In some embodiments, the method may comprise configuring a special capacity limit in the special operating mode to be lower than the nominal capacity limit in the nominal operating mode. Optionally, the special capacity limit may be related to a total weight or a number of passengers inside the elevator car 10.

In some embodiments, wherein the elevator system 100 comprises a group of elevators, such as comprising at least two elevator cars 10A-10C arranged to be moved, that is being movable, in designated elevator shafts 12A-120, the method comprising co-operating the elevator cars 10A-10C. Optionally, the method may comprise arranging, in the special operating mode, each one of the elevator cars 10 which are empty to the landing 19 so as to allow distribution of the number of passenger into the at least two elevator cars 10.

In some embodiments, the method may comprise configuring, in the special operating mode, only the elevator car 10 which is or cars 10 which are empty to respond to the call.

Method execution may be stopped at step 499. The elevator system 100 may be continued to operate in the special operating mode or it may be switched back to the nominal operating mode.

Furthermore, the method may comprise, in the special operating mode, visually and/or audibly indicating the determination of the special operating mode outside the elevator car. Optionally, the elevator system 100, or at least the elevator and/or the elevator car 10; 10A-100 thereof, may be arranged to issue an alert if the special capacity limit is exceeded.

In case of at least two elevator cars, the method may comprise arranging, in the special operating mode, at least two of the elevator cars 10 to the landing so as to allow distribution of the number of passenger into the at least two elevator cars 10.

Furthermore, the elevator control unit 110 may be configured to record multiple calls from the landing 19, such as two passengers may input an elevator call wishing to travel into the same or different landing 19. The method may then comprise arranging, in the special operating mode, as many elevator cars 10A-10C to the landing 19 as the number of elevator calls from said landing 19.

In various embodiments, the method may comprise arranging, in the special operating mode, all empty elevator cars 10A-10C to a main landing. The main landing may be, for example, the street level landing or other such a landing which is typically the landing from which the passengers enter the elevator car 10; 10A-10C or which is their destination from other landings 19.

Furthermore, the method may comprise bypassing, in the special operating mode, the landings 19 from which calls are recorded if the elevator car 10 is not empty.

In various embodiments, the method may comprise utilizing, in the special operating mode, in response to the elevator call, the elevator car 10 which has been unused for the longest.

Additionally, the method may comprise indicating instructions outside the elevator car 10; 10A-10C instructing to enter the elevator car 10; 10A-10C alone.

Figure 5:
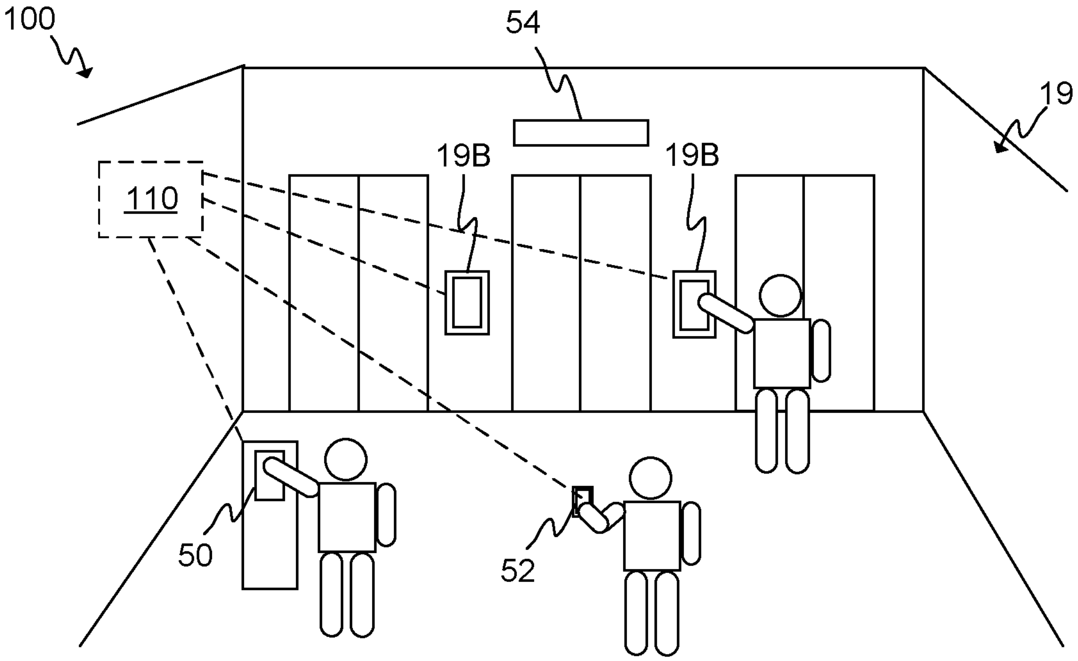
FIG. 5 illustrates schematically an elevator system according to an embodiment of the present invention.

FIG. 5 illustrates schematically an elevator system 100 according to an embodiment of the present invention. The elevator system 100 may be a group of elevators that comprises at least two elevator cars 10, or at least three, arranged to be moved in their respective elevator shafts 12. In FIG. 5, three passengers are shown which have an intention to enter an elevator car 10A-10C of the elevator system 100.

The elevator system 100 may comprise landing call devices 19B being arranged to register elevator calls for the elevator car 10. The elevator system 100 may also comprise an elevator control unit 110 for controlling the operation of the elevator system 100. The unit 110 may be a single unit or distributed in various positions, preferably, of the elevator system 100. Alternatively or in addition, there may be destination operating panel(s) 50 which may be arranged to various positions in the environment, such as the building, in which the elevator 100 resides. The destination operating panel 50, if any, may be arranged to receive a call to move an elevator car 10 certain landing 19. Thus, the passenger already inputs the landing 19 to which he wishes to travel before entering the car 10.

The destination operating panel 50 may be such that it can be connected with a remote terminal 52, such as a smart phone or an identification tag, of the passenger. In case of the remote terminal 52, the destination operating panel 50 may be comprised in the elevator control unit 110 having also a wireless communication device therein. Thus, the destination operating panel 50 may comprise wireless communication device and/or tag readers or the like.

In FIG. 5, an instruction device 54 is shown. The instruction device 54 may be, for example, a display screen for displaying instruction to the passengers. It may include informing the passengers about the special operating mode of the elevator system 100, such as about the special capacity limit. The instruction device 54 may, alternatively or in addition, comprise a speaker configured to provide audible instructions.

Figure 6:
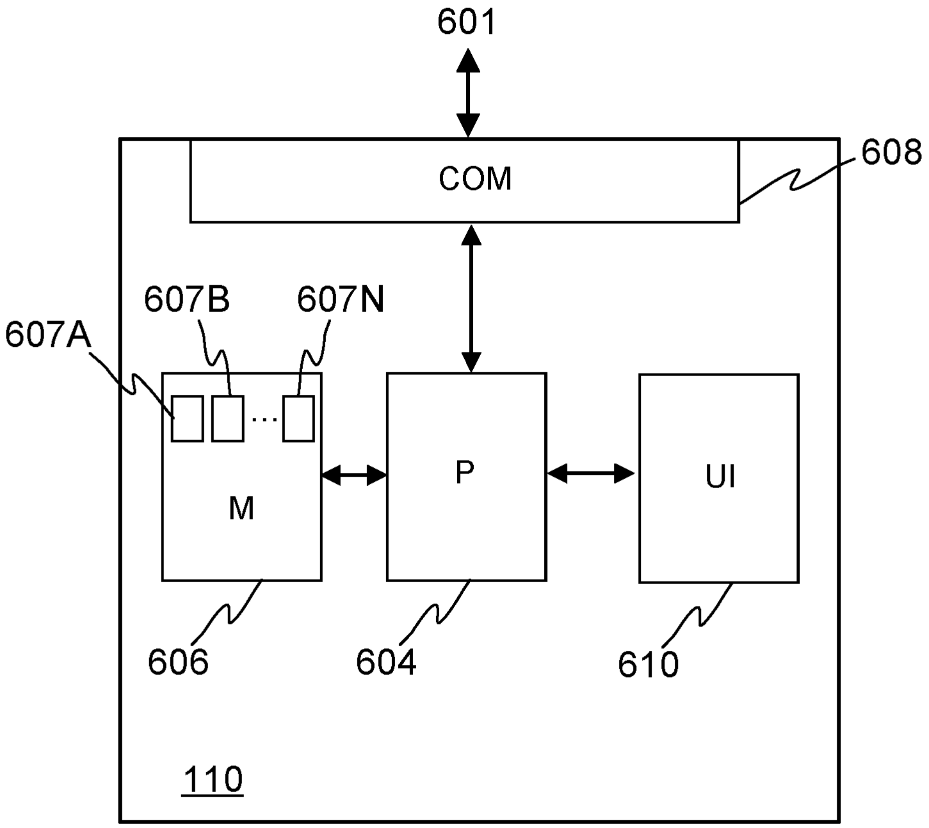
FIG. 6 illustrates schematically an elevator control unit according to an embodiment of the present invention.

FIG. 6 illustrates schematically an elevator control unit 110 according to an embodiment of the present invention. External units 601 may be connected to a communication interface 608 of the elevator control unit 110. External unit 601 may comprise wireless connection or a connection by a wired manner. The communication interface 608 may provide interface for communication with external units 601 such as the elevator car(s) 10; 10A-10C, the doors of the landing floors 19, the car operating panels 11, the landing call devices 19B, destination oper-sting panels 50, and/or the electrical converter unit 30 to the elevator control unit 110. There may also be connecting to the external system, such as a laptop or a handheld device or remote terminals 52. There may also be a connection to a database of the elevator system 100 or an external database including information used in controlling the operation of the elevator system 100.

The elevator control unit 110 may comprise one or more processors 604, one or more memories 606 being volatile or non-volatile for storing portions of computer program code 607A-607N and any data values and possibly one or more user interface units 610. The mentioned elements may be communicatively coupled to each other with e.g. an internal bus.

The processor 604 of the elevator control unit 110 may at least be configured to implement at least some method steps as described hereinabove. The imple-mentation of the method may be achieved by arranging the processor 604 to execute at least some portion of computer program code 607A-607N stored in the memory 606 causing the processor 604, and thus the elevator control unit 110, to implement one or more method steps as described. The processor 604 is thus arranged to access the memory 606 and retrieve and store any information therefrom and thereto. For sake of clarity, the processor 604 herein refers to any unit suitable for processing information and control the operation of the elevator control unit 110, among other tasks. The operations may also be implemented with a microcontroller solution with embedded software. Similarly, the memory 606 is not limited to a certain type of memory only, but any memory type suitable for storing the described pieces of information may be applied in the context of the present invention.

The invention claimed is:

1. A method for operating an elevator system, wherein the elevator system comprises a plurality of elevator cars movable between landings, in response to an elevator call registered by an elevator control unit, the method comprising:

determining a special operating mode of the elevator system, the special operating mode being different from a nominal operating mode at least with respect to a characteristic of use of each elevator car;

operating, in the special operating mode, the elevator system so as to reduce a number of passengers entering at least two elevator cars from the landing compared to the nominal operating mode based on the characteristic;

setting a special capacity limit for the at least two elevator cars that is lower than a nominal capacity limit; and arranging, in the special operating mode, the at least two elevator cars to the landing to allow for distribution of the number of passengers into the at least two elevator cars such that the special capacity limit is not exceeded in each of the at least two elevator cars.

2. The method of claim 1, comprising, in the special operating mode, visually and/or audibly indicating the determination of the special operating mode outside the at least two elevator cars.

3. The method of claim 2, wherein each elevator car is configured to include the nominal capacity limit in the nominal operating mode.

4. The method of claim 2, further comprising co-operating the elevator cars.

5. The method of claim 1, wherein each elevator car is configured to include the nominal capacity limit in the nominal operating mode.

6. The method of claim 5, wherein the elevator system is arranged to issue an alert if the special capacity limit is exceeded.

7. The method of claim 6, wherein the special capacity limit is related to a total weight or a number of passengers inside the elevator car.

8. The method of claim 6, further comprising co-operating the elevator cars.

9. The method of claim 5, wherein the special capacity limit is related to a total weight or a number of passengers inside the elevator car.

10. The method of claim 5, further comprising co-operating the elevator cars.

11. The method of claim 1, further comprising co-operating the elevator cars.

12. The method of claim 11, comprising arranging, in the special operating mode, each one of the elevator cars which are empty to the landing so as to allow distribution of the number of passenger into the elevator cars.

13. The method of claim 11, wherein the elevator control unit is configured to record multiple calls from the landing, the method comprising arranging, in the special operating mode, as many elevator cars to the landing as the number of calls from said landing.

14. The method of claim 11, comprising arranging, in the special operating mode, all empty elevator cars to a main landing.

15. The method of claim 1, comprising configuring, in the special operating mode, only the elevator cars which are empty to respond to the call.

16. The method of claim 1, comprising bypassing, in the special operating mode, the landings from which calls are recorded if the elevator car is not empty.

17. The method of claim 1, comprising utilizing, in the special operating mode, in response to the call, the elevator car which has been unused for the longest.

18. The method of claim 1, comprising indicating instructions outside the elevator car instructing to enter the elevator car alone.

19. An elevator system comprising a plurality of elevator cars movable between landings, in response to an elevator call registered by an elevator control unit, and the elevator control unit, the elevator control unit configured to at least:

determine a special operating mode of the elevator system, the special operating mode being different from a nominal operating mode at least with respect to a characteristic of use of each elevator car;

operate, in the special operating mode, the elevator system so as to reduce a number of passengers entering at least two elevator cars from the landing compared to the nominal operating mode based on the characteristic;

set a special capacity limit for the at least two elevator cars that is lower than a nominal capacity limit; and arrange, in the special operating mode, the at least two elevator cars to the landing to allow for distribution of the number of passengers into the at least two elevator cars such that the special capacity limit is not exceeded in each of the at least two elevator cars.

* * * * *